United States Patent
DeLong (10) Patent No.: US 6,859,239 B2
(45) Date of Patent: Feb. 22, 2005

(54) PROJECTION SYSTEM WITH FOLDED OPTICAL PATH

(75) Inventor: James Andrew DeLong, Shady Shores, TX (US)

(73) Assignee: InFocus Corporation, Wilsonville, OR (US)

( * ) Notice: Subject to any disclaimer, the term of this patent is extended or adjusted under 35 U.S.C. 154(b) by 702 days.

(21) Appl. No.: 09/811,055

(22) Filed: Mar. 15, 2001

(65) Prior Publication Data

US 2002/0118310 A1 Aug. 29, 2002

Related U.S. Application Data (60) Provisional application No. 60/271,896, filed on Feb. 26, 2001.

(51) Int. Cl.$^7$ .............................. H04N 9/12; H04N 5/64
(52) U.S. Cl. ...................... 348/771; 348/745; 348/756; 348/759; 348/780; 348/782; 353/38; 353/84; 353/98
(58) Field of Search ................................ 348/742–745, 348/756–757, 759, 771, 780–782; 353/38, 84, 98–99; H04N 9/12, 5/64

(56) References Cited

U.S. PATENT DOCUMENTS

| | | | |
|---|---|---|---|
| 5,159,485 A | | 10/1992 | Nelson |
| 5,192,946 A | * | 3/1993 | Thompson et al. .......... 348/764 |
| 5,905,545 A | * | 5/1999 | Poradish et al. ............. 348/743 |
| 6,219,110 B1 | * | 4/2001 | Ishikawa et al. ............ 348/759 |
| 6,246,446 B1 | * | 6/2001 | Heimbuch et al. .......... 348/750 |
| 6,252,636 B1 | * | 6/2001 | Bartlett ........................ 348/743 |
| 6,334,685 B1 | * | 1/2002 | Slobodin ...................... 353/31 |
| RE37,578 E | | 3/2002 | Gleckman |
| 6,443,576 B1 | * | 9/2002 | Nishida et al. ................ 353/98 |
| 6,556,256 B1 | * | 4/2003 | Kato et al. ................... 348/781 |
| 6,575,579 B1 | * | 6/2003 | Ho ............................... 353/84 |
| 6,619,804 B2 | * | 9/2003 | Davis et al. .................. 353/98 |
| 6,626,541 B2 | * | 9/2003 | Sunaga ......................... 353/69 |
| 6,683,657 B1 | * | 1/2004 | Miyawaki .................... 348/743 |
| 2004/0051851 A1 | * | 3/2004 | Stanton et al. ................ 353/84 |

\* cited by examiner

*Primary Examiner*—Brian P. Yenke
(74) *Attorney, Agent, or Firm*—Schwabe, Williamson & Wyatt, P.C.

(57) ABSTRACT

A high throughput, compact image display apparatus comprises a source unit to generate a spatially uniform light beam that propagates along a first beam path in a first direction. The image display apparatus also comprises an imaging unit to collect and focus the light beam. The imaging unit includes a first refractive optical element disposed in the first beam path, a second refractive optical element disposed in the first beam path, a first reflecting mirror disposed in the first beam path, and a second reflecting mirror, having a concave reflecting surface, disposed in a second beam path defined by the first reflecting mirror and the second reflecting mirror. The second beam path is oriented in a second direction different from the first direction. The image display apparatus also comprises a digital micromirror device ("DMD") to receive the light beam reflected by the second reflecting mirror. The DMD is disposed in a third beam path defined by the second reflecting mirror and the DMD. The third beam path is oriented in a third direction different from the second direction. The image display apparatus also includes a projection lens to collect and project the light beam reflected from the DMD. The projection lens is disposed in a fourth beam path defined by the DMD and the projection lens, that is oriented in a fourth direction different from the third direction.

4 Claims, 4 Drawing Sheets

PROJECTION SYSTEM WITH FOLDED OPTICAL PATH

RELATED APPLICATIONS

This application claims priority to co-pending U.S. Provisional Patent Application No. 60/271,896, filed on Feb. 26, 2001, the entire disclosure of which is incorporated by reference herein.

FIELD OF THE INVENTION

The present invention is directed to a projection system having a folded optical path that achieves high optical throughput in a small size.

BACKGROUND OF THE INVENTION

Conventional projection systems are used to project images, such as from an LCD projector, or High Definition Television ("HDTV"), onto a large screen. Some conventional projection devices utilize the recently developed digital micromirror device (or "DMD", which is a trade name of Texas Instruments). The DMD is a two-dimensional array of a number of pixels (e.g., 1024×768 pixels) each having a micromirror, which corresponds to the pixels of a video display. A DMD control unit controls the tilt of each mirror individually through the effect of an electrostatic field caused by a memory unit arranged for each pixel, respectively. The DMD control unit varies the angle of reflection of a reflected light ray thereby causing an on/off state. Thus, an image shown on a corresponding video display can be magnified and projected onto the large screen.

Many conventional projection systems utilize a linear optical path for the illumination beam, which entails straightforward alignment. However, the physical length required to provide adequate imaging necessarily creates a need for a large housing volume. Another conventional projection system optical layout is shown in FIG. 10 of U.S. Pat. No. 6,129,437. This type of linear layout may provide acceptable optical throughput, but is limited in that significant housing space is required, especially in terms of physical height.

Thus, there is a need to make compact, lightweight, and high efficiency (e.g., high throughput) optical systems for use in electronic projection systems. Typically, in the above mentioned conventional optical projection systems, optical throughput is sacrificed in order to achieve the necessary system packaging goals.

SUMMARY OF THE INVENTION

According to one aspect of the present invention, an image display apparatus comprises a source unit to generate a spatially uniform light beam that propagates along a first beam path in a first direction. The image display apparatus also comprises an imaging unit to collect and focus the light beam. The imaging unit includes a first refractive optical element disposed in the first beam path, a second refractive optical element disposed in the first beam path, a first reflecting mirror disposed in the first beam path, and a second reflecting mirror, having a concave reflecting surface, disposed in a second beam path defined by the first reflecting mirror and the second reflecting mirror. The second beam path is oriented in a second direction different from the first direction. The image display apparatus also comprises a digital micromirror device ("DMD") to receive the light beam reflected by the second reflecting mirror. The DMD is disposed in a third beam path defined by the second reflecting mirror and the DMD. The third beam path is oriented in a third direction different from the second direction. The image display apparatus also includes a projection lens to collect and project the light beam reflected from the DMD. The projection lens is disposed in a fourth beam path defined by the DMD and the projection lens, that is oriented in a fourth direction different from the third direction.

The structure and operation of various aspects of the invention are described in detail below with reference to the accompanying drawings.

BRIEF DESCRIPTION OF THE DRAWINGS

The accompanying drawings, which are incorporated herein and form part of the specification, illustrate the present invention and, together with the description, further serve to explain the principles of the invention and to enable a person skilled in the pertinent art to make and use the invention.

DETAILED DESCRIPTION OF THE PREFERRED EMBODIMENTS

A high optical throughput projection system may have a small size with respect to a packaging size by using a folded optical path, in which the optical path changes directions multiple times in a three dimensional space. In this architecture using a folded optical path, the optical elements are arranged in such a way as to make repeated use of the same space (i.e., volume). Also, the element positions and angles are arranged to minimize the overall height, width and depth of the optical system.

Figure 1:
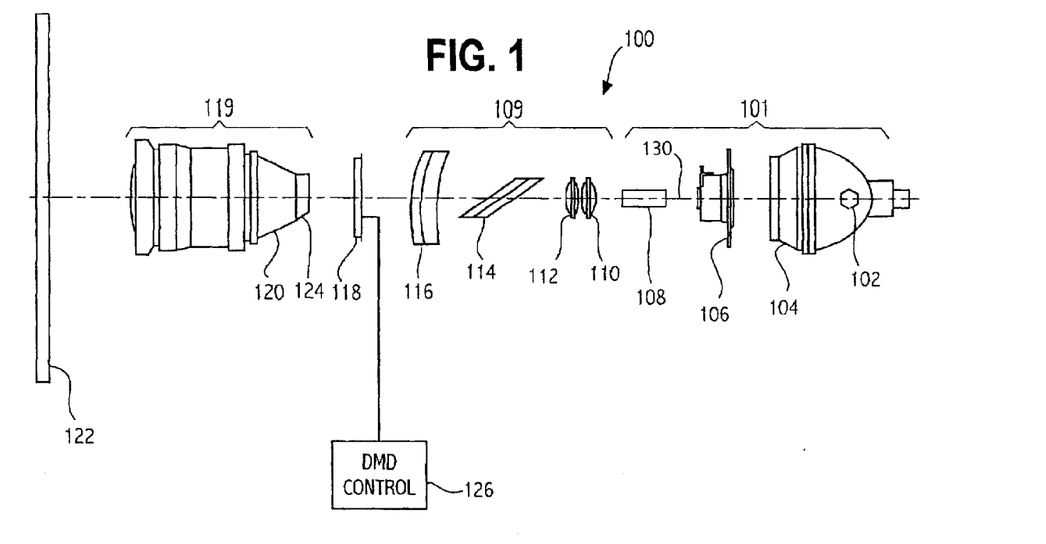
FIG. 1 shows a simplified optical schematic diagram of optical components for use in a projection system in accordance with an embodiment of the present invention.

FIG. 1 shows a simplified optical schematic diagram of the optical components of a projection system 100. The folding arrangement of the present invention is described in detail in FIGS. 2–4, and is not shown in FIG. 1 for simplicity.

Projection system 100 includes a source unit 101, an imaging unit 109, a digital micromirror device ("DMD") 118, and a projection unit 119. Source unit 101 provides homogenized light that is imaged onto DMD 118 by imaging unit 109. The illuminated DMD 118 is projected onto a far away screen 122 by projection unit 119.

Source unit 101 includes a light source 102, a lamp reflector 104, a color wheel 106, and a light integrator device 108. Imaging unit 109 includes a refractive optical element 110, an additional refractive optical element 112, a first fold mirror 114, and a second mirror 116. DMD 118 comprises a conventional DMD, such as that described above. Projection unit 119 comprises a conventional projection lens 120.

The light source 102 can comprise a lamp filament, plasma arc source, or the like, that generates white light from input electrical power. The reflector 104 can comprise a conventional elliptical reflector that collects light emanating from light source 102 and focuses the collected light down (to about a 1–2 mm beam size) onto a surface located near the perimeter of the rotating color wheel 106, which has a diameter of about 40–50 mm. Color wheel 106 selectively and sequentially transmits each of the three primary colors (red, green, and blue) of the initial white light beam through various colored segments sequentially arranged on the perimeter of the rotating wheel. The color wheel can be synchronized with the on/off states of DMD 118 through the use of a conventional color wheel control unit (not shown) in conjunction with a DMD control unit 126.

The elliptical reflector 104 magnifies the image of the light source 102 in such a way as to optimally illuminate the light integrator device 108. The light integrator 108 comprises a conventional integrator rod or pipe, which can be solid or hollow, and transmits (via internal surface reflections) the color-filtered light from an input aperture of the light integrator to an output aperture of the light integrator. Reflections inside the light integrator create multiple images of the light source (i.e., creating an unpolarized, homogenous, virtual source), thus creating a spatially uniform light source that improves the luminance uniformity of the projection system. The light integrator 108 can be about 6–10 mm in width and height, with a length of about 15 mm to about 30 mm. The format of the output aperture of the light integrator 108 may approximately match the format of the surface area of the DMD 118, such as a 4×3 format.

The refractive optical elements 110, 112 can be spherical or aspheric lenses made from glass, high temperature plastic, or the like. In a preferred embodiment, optical elements 110 and 112 include at least one aspheric surface in order to reduce spherical aberrations. Optical elements 110, 112 collect the spatially uniform light emanating from the output aperture of the light integrator 108. Optical elements 110, 112 transmit and focus the spatially uniform light onto the first fold mirror 114. Preferably, optical element 110 has a focal length of about 16 mm and optical element 112 has a focal length of about 16.3 mm. Preferably, elements 110 and 112 are lenses having a physical diameter of about 18 mm. The numerical aperture (NA) for the optical elements 110 and 112 may be about 0.5.

The reflecting surface of first fold mirror 114 is preferably flat and reflects the spatially uniform light onto the second mirror 116. Alternatively, the reflecting surface of first fold mirror 114 can be slightly concave (i.e., having some additional focussing optical power). In a preferred embodiment, both mirrors 114 and 116 are made from conventional materials and have reflective surfaces comprising metal or dielectric coatings.

The second mirror 116 is a concave mirror and collects the light from the first fold mirror 114 and focuses it down onto the active surface area of the DMD 118. The effective focal length of second mirror 116 is about 30 mm to about 32. In one embodiment, the effective focal length of the second mirror 116 may be 30.66. Preferably, the refractive optical power of elements 110, 112, 114, and 116 and their relative axial positions (with respect to the optic axis 130) are designed to image the illuminated output aperture of the light integrator 108 onto the active surface area of DMD 118 in such a way as to fully and uniformly illuminate the active surface area of DMD 118.

As mentioned above, a DMD is a reflective spatial light modulator consisting of micro machined mirrors. A conventional tilt angle for the micromirrors is ±10 degrees. The mirrors of DMD 118 are tilted in such a way as to directly reflect the light from the second mirror into the aperture (or entrance pupil) 124 of the projection lens 120. A conventional DMD control unit 126 controls the DMD picture elements (i.e., pixels) in such a way as to cause spatial and temporal modulation of the incident light. For example, DMD 118 can comprise a conventional DMD unit (available from Texas Instruments) having a diagonal length of about 0.7 inches to about 0.9 inches. The pixels can have a conventional 1024 pixel×768 pixel array, with each pixel being about 10–15 um in size.

The projection lens 120 transmits the light from the DMD 118 to a distant screen 122 in such a way as to reproduce the images created by the spatial modulation of the DMD pixels. According to a preferred embodiment, the optical power (i.e., effective focal length) of projection lens 120 can be varied so as to produce the necessary display image size at the screen 122. The projection lens 120 can be a conventional projection lens that comprises several lenses to collect and magnify the received image.

As would be apparent to one of ordinary skill in the art given the present description, the optical path distance between the various optical components should be maintained in order to achieve the necessary magnifications. For example, the optical separations between the refractive positive element 112 and the first fold mirror 114; between the first fold mirror 114 and the concave second mirror 116; between the concave second mirror 116 and the DMD 118; and between the DMD 118 and the projection lens 120 can be optimized to achieve necessary magnification, depending on the optical characteristics of the chosen elements, such as numerical aperture, effective focal length, etc. In this example, the DMD 118, having a diagonal dimension of about 0.7–0.9 inches, is magnified to an image having a diagonal of about 40 inches to about 60 inches (about a 50–70 times magnification). The separations between the optical components typically make up a significant portion of the total optical packaging volume, which leads to the aforementioned size problems of conventional systems.

Figure 2:
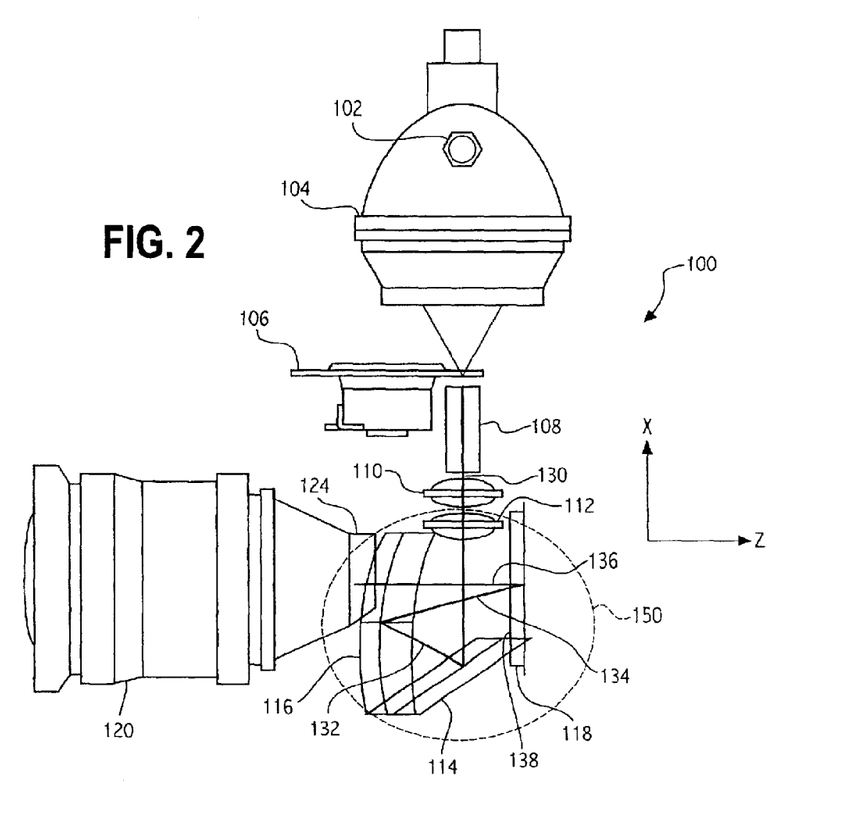
FIG. 2 shows a top view (in the X-Z plane) of a preferred arrangement of a projection system according to one embodiment of the present invention.
Figure 3:
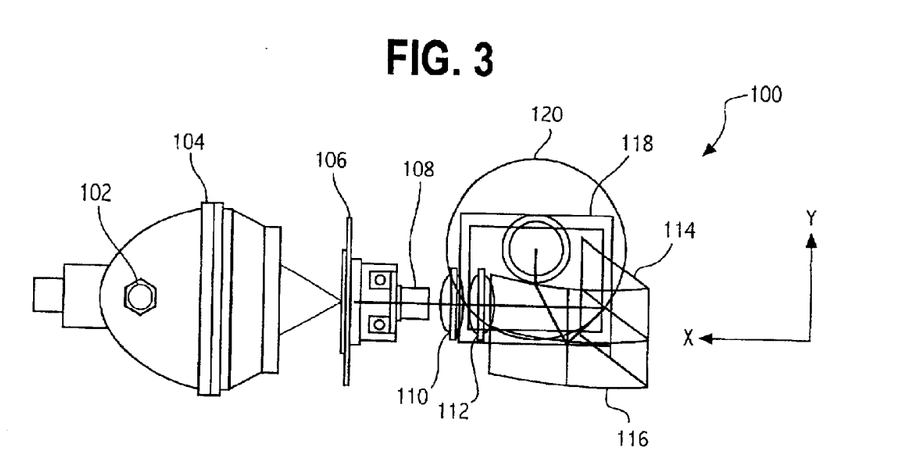
FIG. 3 shows a front view (in the X-Y plane) of the preferred arrangement of the projection system shown in FIG. 2.
Figure 4:
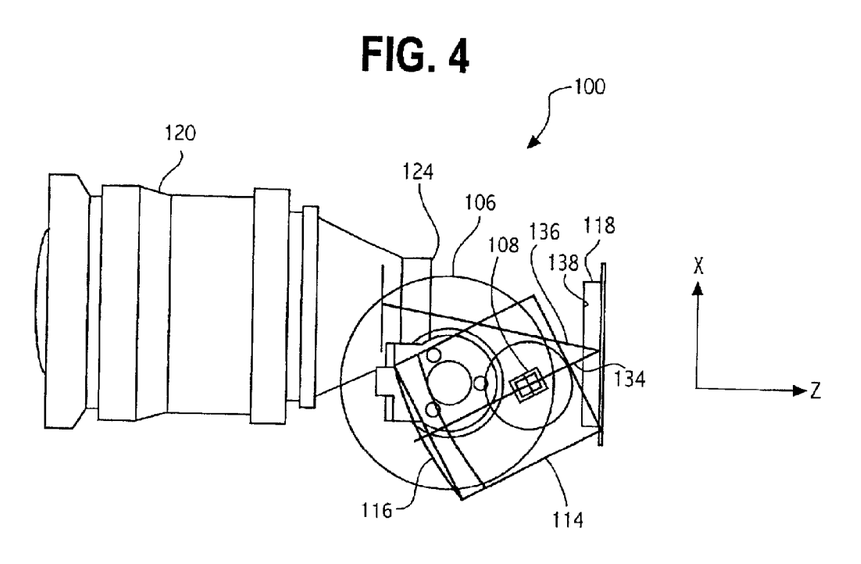
FIG. 4 shows a right side view (in the Y-Z plane) of the preferred arrangement of the projection system shown in FIG. 2.

FIG. 2 shows a top view (in the X-Z plane) of a preferred arrangement of projection system 100, according to the present invention, where the illuminating light is folded multiple times in three-dimensional region 150. FIG. 3 shows a front view (in the X-Y plane) of this arrangement, and FIG. 4 shows a right side view (in the Y-Z plane) of this arrangement of projection system 100. Axis designations (i.e., X, Y, and Z axis designations) are shown in FIGS. 2–4 in order to illustrate the manner in which the components are offset with respect to one another in terms of lateral space and height. Those skilled in the art will of course recognize that the particular labels X, Y and Z chosen for the axis designations, as well as their respective directions of orientation, are for convenience only in describing the illustrated embodiments and are not to be limiting in any way. As such, the labels X, Y and Z could be rearranged, or an entirely different set of labels could be used. Here, optical path 130 is directed along the negative X axis (180 degrees with respect to the X axis) as shown in FIG. 2.

In this architecture, spatially uniform light is incident on the first mirror 114. The angle in which the incident light is reflected has both a lateral angle component and a tilt angle component. The lateral angle is the angle at which the incident light changes direction in the X-Z plane, as measured from the X axis. The lateral angle is measured from −180 to +180 degrees, where the positive X axis corresponds to 0 degrees. The tilt angle is the angle at which the incident light changes direction in the Y-Z plane, as measured from the Y axis. The tilt angle is measured from −180 to +180 degrees, where the positive Y axis corresponds to 0 degrees. FIG. 2 effectively shows the lateral angles of the light reflected by the first mirror 114, the second mirror 116 and the DMD 118. FIG. 4 effectively shows the tilt angles of the light reflected by the first mirror 114, the second mirror 116 and the DMD 118.

The spatially uniform light, which is incident on the first mirror 114 along optical path 130 (180 degrees with respect to the X axis), is directed downwardly and forwardly from the first mirror 114 to the second mirror 116, at a lateral angle of about 60 degrees to about 62 degrees and at a tilt angle of about −114 degrees to about −116 degrees, as illustrated by optical path 132 shown in FIG. 2. At the second mirror 116, light is reflected laterally and upwardly towards the DMD 118, through the same physical volume of region 150, at a lateral angle of about −74 degrees to about −76 degrees and at a tilt angle of about 64 degrees to about 66 degrees, as illustrated by optical path 134 shown in FIG. 2. At DMD 118, light is reflected at a lateral angle of about 90 degrees and at a tilt angle of about −79 degrees to about −81 degrees as illustrated by optical path 136 shown in FIG. 2. Thus, the optical arrangement of the present invention utilizes a folded optical path through the same physical volume, which results in high optical throughput (as the optical path length has not been reduced) and reduced optical package volume, as the same air space volume is shared by four optical paths.

Figure 7A:
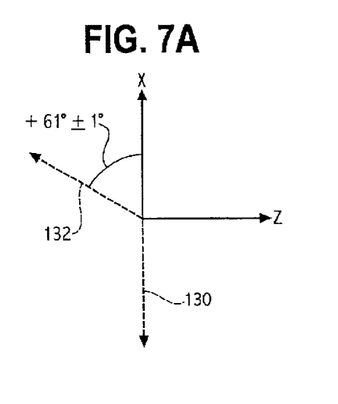
FIGS. 7A–7C are graphical representations of the lateral angles formed by the beam paths in the projection system of FIG. 2.
Figure 7B:
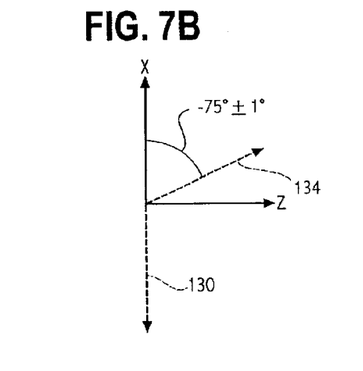
Figure 7C:
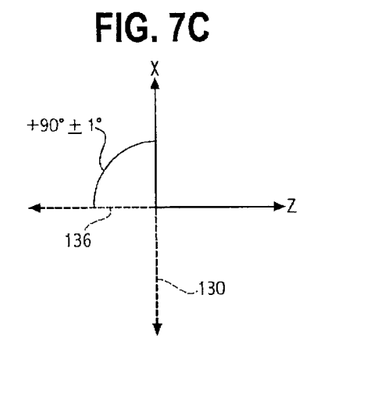

To further explain the lateral angles defined above, FIGS. 7A–7C show each of the lateral angles formed by the light paths 132, 134 and 136, respectively, in the X-Z plane with respect to the X axis. Each angle is formed with respect to the positive X axis. As shown in FIG. 7A, the lateral angle for the light path 132 is about 60 degrees to about 62 degrees. As shown in FIG. 7B, the lateral angle for the light path 134 is about −74 degrees to about −76 degrees. As shown in FIG. 7C, the lateral angle for the light path 136 is about 90 degrees.

Figure 8A:
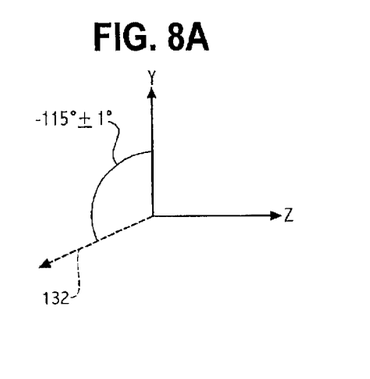
FIGS. 8A–8C are graphical representations of the tilt angles formed by the beam paths in the projection system of FIG. 2.
Figure 8B:
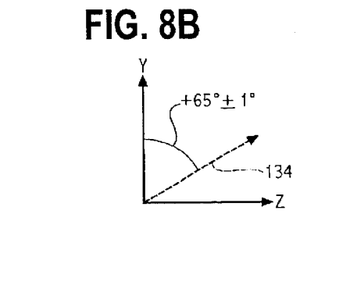
Figure 8C:
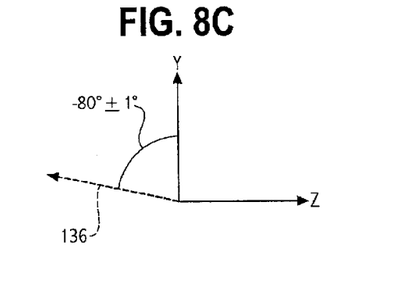

To further explain the tilt angles defined above, FIGS. 8–8C show each of the tilt angles formed by the light paths 132, 134 and 136, respectively, in the Y-Z plane with respect to the Y axis. Each angle is formed with respect to the positive Y axis. As shown in FIG. 8A, the tilt angle for the light path 132 is about −114 degrees to about −116 degrees. As shown in FIG. 8B, the tilt angle for the light path 134 is about 64 degrees to about 66 degrees. As shown in FIG. 8C, the tilt angle for the light path 136 is about −79 degrees to about −81 degrees.

In an example of the arrangement described above with respect to FIGS. 2–4, the input aperture of the light integrator 108 is located about 63 mm to about 65 mm from the vertex of the reflector 104 and about 17 mm to about 18 mm from the mount face of the reflector 104. Lens 110 is located about 2 mm to about 3 mm, or about 2.82 mm, from the light integrator 108, lens 110 is located about 2 mm to about 3 mm, or about 2.5 mm, from lens 112, and lens 112 is located about 28 mm to about 30 mm, or about 29 mm, from the first mirror 114, with all distances measured along optical path 130. The first mirror 114 is located about 22 mm to about 24 mm, or about 23 mm, from second mirror 116, as measured along optical path 132. The second mirror 116 is located about 38 mm to about 40 mm, or about 39 mm, from DMD active area surface 138, as measured along optical path 134. The projection lens pupil 124 is located about 40 mm to about 42 mm from the DMD active area surface 138 as measured along optical path 136.

Figure 5:
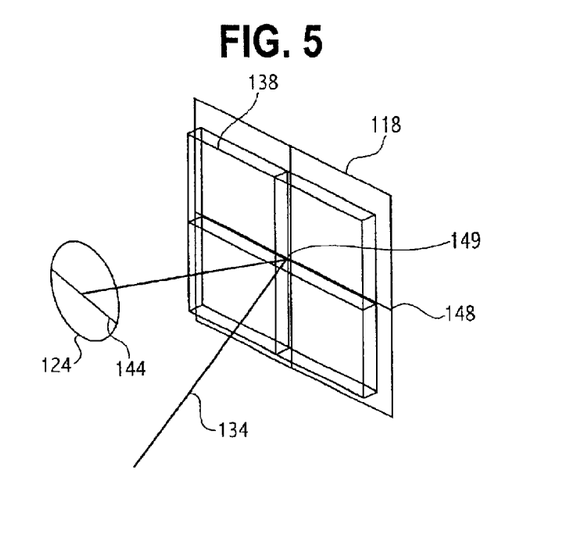
FIG. 5 shows a schematic diagram of the input angle of the illuminating light on a DMD.

FIG. 5 shows a schematic diagram of the input angle of the illuminating light on DMD 118. In conjunction with the optical component arrangement described above, the DMD centerline 148 is positioned about 6 mm to about 8 mm, preferably 7 mm, below the projection lens pupil centerline 144. Consequently, the chief ray 134 incident on the DMD center 148 is not at 20 degrees relative to the DMD surface normal (i.e., a line extending normal or perpendicular to the DMD surface 138), as is the case in conventional telecentric illumination designs. For the projection system design according to a preferred embodiment of the present invention, the incident angle is actually about 27 degrees to about 29 degrees, preferably 28 degrees. This increased angle of incidence allows greater clearance between the projection lens pupil 124 and the illumination optical elements described above. This arrangement further results in the benefit of providing improved contrast, since undesirable scattered light, that is scattered from the DMD and DMD window surfaces, is blocked by the projection lens aperture stop.

The projection lens aperture stop is inside the barrel of the projection lens 120. The back of the projection lens 120 is about 37 mm from the DMD 118. The projection lens pupil 124 is about 40 mm from the DMD 118, and consequently about 3 mm inside the projection lens 120. The offset of the projection lens pupil 124 in the projection lens 124 allows for a larger numerical aperture at the DMD 118, which improves overall collection efficiency and brightness.

Figure 6:
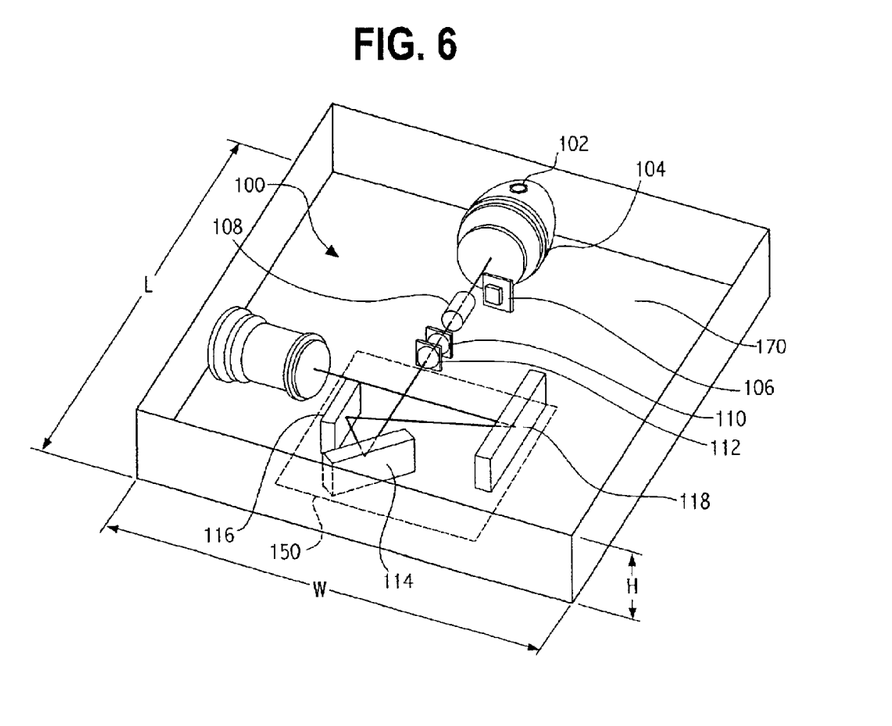
FIG. 6 is a diagrammatic view of a housing unit that houses the optical components of projection system according to an embodiment of the present invention.

FIG. 6 shows a perspective view of the housing 170 that houses the optical components of projection system 100. Because of the folded optical path design in volume region 150, housing 170 can have an extremely compact size. For example, the length (L) of housing 170 for the entire optical system (i.e., including the light source 102) can be about 160 mm to about 180 mm, or about 35 mm to about 40 mm for just the optical components (i.e., lenses 110 and 112, mirrors 114 and 116, DMD 118 and lens pupil 24). The width (w) of housing 170 for the entire optical system can be about 140 mm to about 150 mm, or about 50 mm to about 60 mm for just the optical components. Finally, the height (h) of housing 170 for the entire optical system can be about 60 mm to about 70 mm, or about 40 mm to about 50 mm for just the optical components. Thus, the total size of housing 170 can be about the size of a laptop computer. With this design, the folded optical beam path (combined optical paths 130, 132, 134, 136 from refractive optical element 110 to projection lens pupil 124) in the imaging unit can occupy a volume of about 5.5 inches$^3$. From this portable projection system, a projected image of about 1800 inches$^2$ can be displayed on a projection screen. There is no limit, however, to the size of the projected image if the projection distance is not fixed.

While the invention has been described in detail and with reference to specific embodiments thereof, it will be apparent to one skilled in the art that various changes and modifications can be made therein without departing from the scope of the invention.

What is claimed is:

1. An image display apparatus, comprising:
   a source unit to generate a spatially uniform light beam that propagates along a first beam path in a first direction;

an imaging unit to collect and focus the light beam, wherein the imaging unit includes:

a first refractive optical element disposed in the first beam path, a second refractive optical element disposed in the first beam path, a first reflecting mirror disposed in a second beam path is oriented in a second direction that is different from the first direction and directed away from a digital micromirror device ("DMD"), and wherein the second reflecting mirror has a concave reflecting surface;

the DMD to receive the light beam reflected by the second reflecting mirror and disposed in a third beam path defined by the second reflecting mirror and the DMD, wherein the third beam path is oriented in a third direction from the second direction; and a projection lens to collect and project the light beam reflected from the DMD and disposed in a fourth beam path defined by the DMD and the projection lens, wherein the fourth beam path is oriented in a fourth direction different from the third direction.

2. The image display apparatus of claim 1, wherein the first reflecting mirror is adjacent to the second reflecting mirror.

3. The image display apparatus of claim 1, wherein the second refractive optical element, the first reflecting mirror, the second reflecting mirror, and the DMD are adapted to be sequentially illuminated by the light beam.

4. The image display apparatus of claim 1, wherein the fourth beam path is substantially orthogonal to a line that is parallel to the first beam path.

* * * * *

UNITED STATES PATENT AND TRADEMARK OFFICE
CERTIFICATE OF CORRECTION

PATENT NO. : 6,859,239 B2
DATED : February 22, 2005
INVENTOR(S) : James Andrew DeLong It is certified that error appears in the above-identified patent and that said Letters Patent is hereby corrected as shown below:

Column 4,
Line 18, "1024 pixelx768" should read -- 1024 pixel x 768 --;

Column 5,
Line 48, "FIGS. 8-8C" should read -- FIGS. 8A-8C --;

Column 6,
Line 5, "otptical" should read -- optical --;
Line 15, "center 148" should read -- center 149 --;
Line 43, "pupil 24)." should read -- pupil 124). --;

Column 6, line 64 - Column 8, line 5,
Claim 1 should read as follows:
-- 1. An image display apparatus, comprising:
a source unit to generate a spatially uniform light beam that propagates along a first beam path in a first direction;
an imaging unit to collect and focus the light beam, wherein the imaging unit includes;
a first refractive optical element disposed in the first beam path,
a second refractive optical element disposed in the first beam path,
a first reflecting mirror disposed in the first beam path, and a second reflecting mirror disposed in a second beam path defined by the first reflecting mirror and the second reflecting mirror, wherein the second beam path is oriented in a second direction that is different from the first direction and directed away from a digital micromirror device ("DMD"), and wherein the second reflecting mirror has a concave reflecting surface;
the DMD to receive the light beam reflected by the second reflecting mirror and disposed in a third beam path defined by the second reflecting mirror and the DMD, wherein the third beam path is oriented in a third direction different from the second direction; and

UNITED STATES PATENT AND TRADEMARK OFFICE
CERTIFICATE OF CORRECTION

PATENT NO. : 6,859,239 B2
DATED : February 22, 2005
INVENTOR(S) : James Andrew DeLong It is certified that error appears in the above-identified patent and that said Letters Patent is hereby corrected as shown below:

Column 6, line 64 - Column 8, line 5 (cont'd),
    a projection lens to collect and project the light beam reflected from the DMD and disposed in a fourth beam path defined by the DMD and the projection lens, wherein the fourth beam path is oriented in a fourth direction different from the third direction. --.

Signed and Sealed this

Fourth Day of October, 2005

JON W. DUDAS
*Director of the United States Patent and Trademark Office*